United States Patent
Hideo

(10) Patent No.: US 7,511,781 B2
(45) Date of Patent: Mar. 31, 2009

(54) METHOD FOR MANUFACTURING LIQUID CRYSTAL DISPLAY DEVICE

(75) Inventor: Tanaka Hideo, Kobe (JP)

(73) Assignee: TPO Hong Kong Holding Limited, Shatin, Hong Kong Sar (CN)

( * ) Notice: Subject to any disclaimer, the term of this patent is extended or adjusted under 35 U.S.C. 154(b) by 259 days.

(21) Appl. No.: 10/559,169

(22) PCT Filed: Jun. 3, 2004

(86) PCT No.: PCT/IB2004/050834

§ 371 (c)(1), (2), (4) Date: Dec. 1, 2005

(87) PCT Pub. No.: WO2004/109381

PCT Pub. Date: Dec. 16, 2004

(65) Prior Publication Data

US 2006/0164573 A1    Jul. 27, 2006

(30) Foreign Application Priority Data

Jun. 4, 2003    (WO) .................. PCT/IB03/02538

(51) Int. Cl.
G02F 1/136    (2006.01)

(52) U.S. Cl. .................. 349/43; 349/47; 349/113; 349/187

(58) Field of Classification Search .................. 349/113, 349/43, 47, 46, 187
See application file for complete search history.

(56) References Cited

U.S. PATENT DOCUMENTS

| 7,119,862 | B2* | 10/2006 | Choi | 349/113 |
| 2003/0025847 | A1 | 2/2003 | Sumi | |
| 2004/0080688 | A1* | 4/2004 | Ishida | 349/113 |
| 2004/0141116 | A1* | 7/2004 | You | 349/113 |
| 2004/0195574 | A1* | 10/2004 | Ahn et al. | 257/72 |

* cited by examiner

Primary Examiner—David Nelms
Assistant Examiner—Thanh-Nhan P Nguyen
(74) Attorney, Agent, or Firm—Liu & Liu

(57) ABSTRACT

A semiconductor film is formed in a gap between a source electrode and a drain electrode of a thin film transistor in an active-matrix type liquid crystal display device. A metal film for a gate electrode is formed on said semiconductor film via a gate insulating film. A photo-resist film, having a thick portion in region including the gap and having an opening portion in contact-hole forming region, is formed on the metal film. A contact-hole is formed in the gate insulating film by using the organic material film as a mask. The organic material film is left on the region including the gap. A gate electrode is formed on the region including the gap by etching the first metal film by using the remained organic material film as a mask. An organic material film, having projections and depressions, is formed on a reflective region except the contact-hole forming region. A reflective electrode is formed on the organic material film having projections and depressions

5 Claims, 5 Drawing Sheets

(a)

(b)

[Fig. 6] (PRIOR ART)
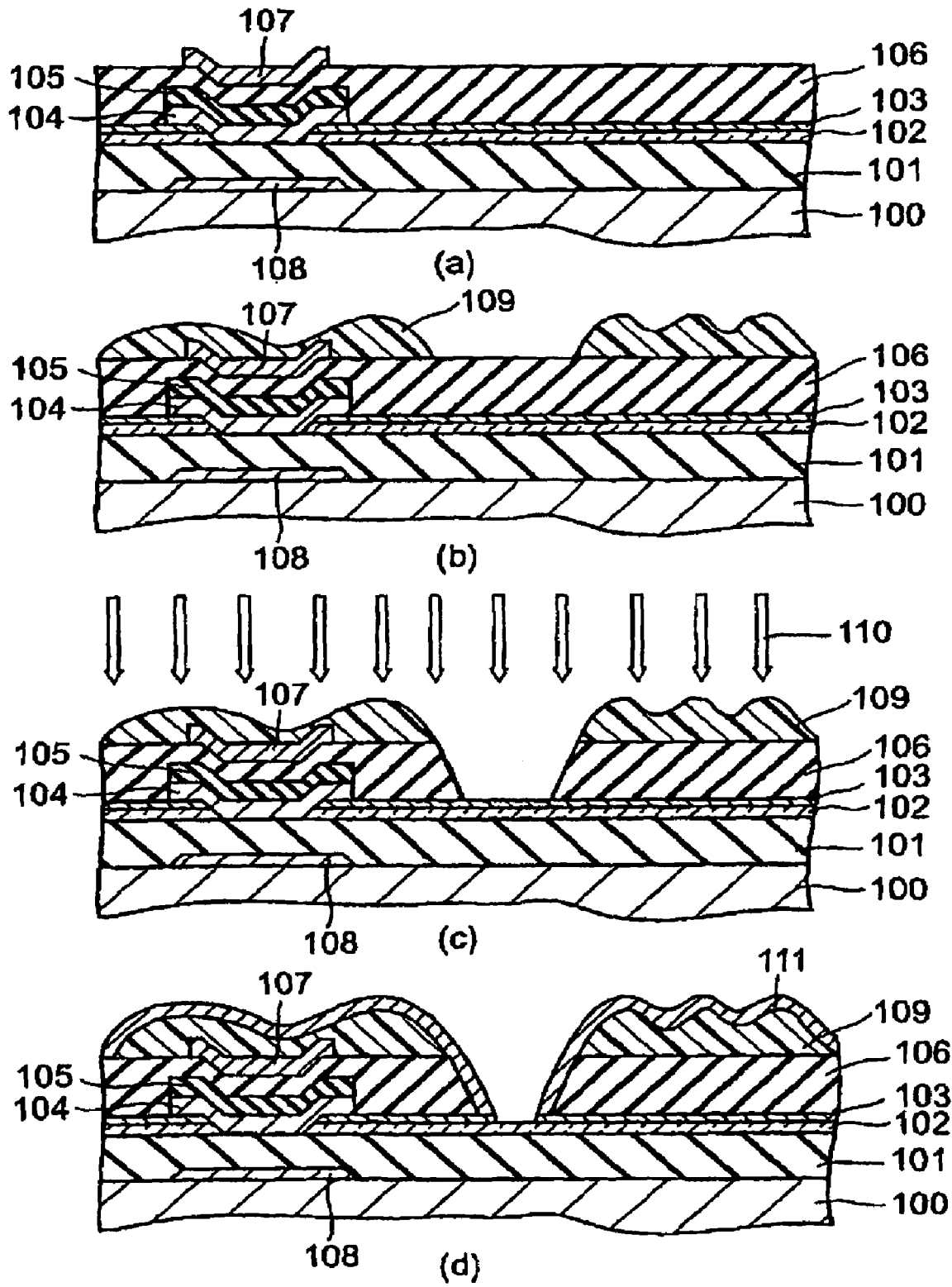

METHOD FOR MANUFACTURING LIQUID CRYSTAL DISPLAY DEVICE

TECHNICAL FIELD

The present invention relates to a method for manufacturing a liquid crystal display device, particularly to a method for manufacturing a liquid crystal display device exhibiting improved optical characteristics without increasing photolithography processes.

BACKGROUND ART

In an active-matrix type liquid crystal display device, in order to improve optical diffusion characteristics of a reflective electrode, an organic material film with projections and depressions is formed as a primer film of the reflective electrode in a pixel region, and the reflective electrode is formed on the primer film (IDP:In-cell Diffusing Reflector). In the case of forming a contact-hole in a gate insulating film of a thin film transistor TFT), in order to eliminate a photolithography process of the contact-hole, the contact-hole is successively formed in the gate insulating film when the contact-hole is formed in the organic material film of IDR (Hatta et al, 'A novel 5-mask top-gate TFT process for reflective LCD panels' Digest of technical papers AM-LCD 02, p 207-210).

The method will be described with reference to FIG. 6.

FIGS. 6(a) to 6(d) are sectional views showing a conventional method for manufacturing a liquid crystal display device. First, as shown in FIG. 6(a), for example, a chrome film is deposited on a glass substrate 100, a light shield film 108 is formed by leaving the chrome film in a portion corresponding to a wiring region by a photolithography process and etching process. Then, a silicon oxide film 101 is formed on the glass substrate 100 and the light shield film 108.

Next, an ITO (Indium-Tin Oxide) film 102 and a metal film 103 are successively formed on the silicon oxide film 101, and an opening portion is formed in the gate region by the photolithography process and etching process. Then, an amorphous silicon (a-Si) film 104 and silicon nitride film 105 are successively formed on the metal film 103 having the opening portion, and are left in the gate region by the photolithography process and etching process.

A silicon nitride film 106 that is a gate insulating film is formed on the entire surface of the substrate. A metal film for a gate electrode is further formed on the film 1066, and a gate electrode 107 is formed in the gate region by the photolithography process and etching process.

Next, as shown in FIG. 6(b), an organic material film 109 for IDR is formed, and projections and depressions are formed on the surface of the organic material film 109. The projections and depressions are formed by, for example, forming the first-layer organic material film, performing exposures on the film while varying the intensity of light with place so as to leave the film in the shape of islands, and then forming the second-layer organic material film thereon.

Then, as shown in FIG. 6(c), the silicon nitride film 106 is subjected to dry etching by plasma 110 to form a contact-hole of the gate insulating film. Subsequently, as shown in FIG. 6(d), a metal film is deposited in the reflective region to form a reflective electrode 111, and the metal film 103 is etched using the reflective electrode 111 as a mask.

DISCLOSURE OF INVENTION

Technical Problem

However, in the aforementioned method, in forming a contact-hole in the silicon nitride film 106 that is a gate insulating film, the organic material film 109 for IDR is exposed to plasma When the organic material film 109 is exposed to plasma, the surface of the organic material film 109 is shaved, and the projections and depressions become small. When the projections and depressions of the organic material film 109 become small, the light diffusing capability of the reflective electrode becomes low, and there arises a problem that the reflective electrode does not exhibit desired reflective characteristics.

It is an object of the present invention to provide a method for manufacturing a liquid crystal display device exhibiting improved optical characteristics without increasing photolithography processes.

A method for manufacturing a liquid crystal display device of the present invention comprises the steps of forming a semiconductor film in a gap between a source electrode and a drain electrode of a thin film transistor in an active-matrix type liquid crystal display device, and forming a first metal film for a gate electrode on the semiconductor film via a gate insulating film; forming a first organic material film on the first metal film, the first organic material film having a thick portion in a region including the gap and an opening portion in a contact-hole forming region; forming a contact-hole in the gate insulating film by using the first organic material film as a mask, while leaving the first organic material film in the region including the gap; forming the gate electrode on the region including the gap by etching the first metal film by using the first organic material film left as a mask; and forming a second organic material film having projections and depressions in a reflective region except the contact-hole forming region, and forming a reflective electrode on the second organic material film having the projections and depressions.

According to this method, it is possible to form a contact-hole before forming the organic material film for IDR. Therefore, the organic material film for IDR is not exposed to plasma that is used in forming the contact hole. Accordingly, the obtained liquid crystal display device is capable of exhibiting desired optical characteristics due to IDR. Further, since an additional photolithography process is not required, processes do not become complicated.

In a further embodiment of the method for manufacturing a liquid crystal display device according to the present invention, it is preferable that the source electrode is comprised of a transparent electrode and a second metal film formed on the transparent electrode, and the first metal film and the second metal film are both etched when the first metal film is left on the region including the gap.

In a further embodiment of the method for manufacturing a liquid crystal display device according to the present invention, it is preferable that the first organic material film is formed by performing exposures to the first organic material film is formed by using a mask having a shield portion, a half-transparent portion and a transparent portion such that the shield portion is arranged in the region including the gap and the transparent portion is arranged in the contact-hole forming region, performing exposures on an organic material film, and developing the organic material film exposed. The mask is preferably a halftone mask or a diffraction mask.

In a further embodiment of the method for manufacturing a liquid crystal display device according to the present invention, it is preferable that the first metal film in the contact-hole forming region is etched by using the first organic material film as a mask, and then the contact-hole is formed in the gate insulating film by using the first metal film as a mask.

A liquid crystal display device according to the present invention is obtained by the steps of forming a semiconductor film in a gap between a source electrode and a drain electrode of a thin film transistor in an active-matrix type liquid crystal display device, and forming a first metal film for a gate electrode on the semiconductor film via a gate insulating film; forming a first organic material film on the first metal film, the first organic metal film having a thick portion in a region including the gap and an opening portion in a contact-hole forming region; forming a contact-hole in the gate insulating film by using the first organic material film as a mask, while leaving the first organic material film in the region including the gap; forming the gate electrode on the region including the gap by etching the first metal film by using the first organic material film left as a mask; and forming a second organic material film having projections and depressions in a reflective region except the contact-hole forming region, and forming a reflective electrode on the second organic material film having the projections and depressions.

BRIEF DESCRIPTION OF THE DRAWINGS

FIGS. 6a to 6d are sectional views showing a conventional method for manufacturing a liquid crystal display device.

MODE FOR THE INVENTION

An Embodiment of the present invention will be described specifically below with reference to accompanying drawings.

Figure 1:
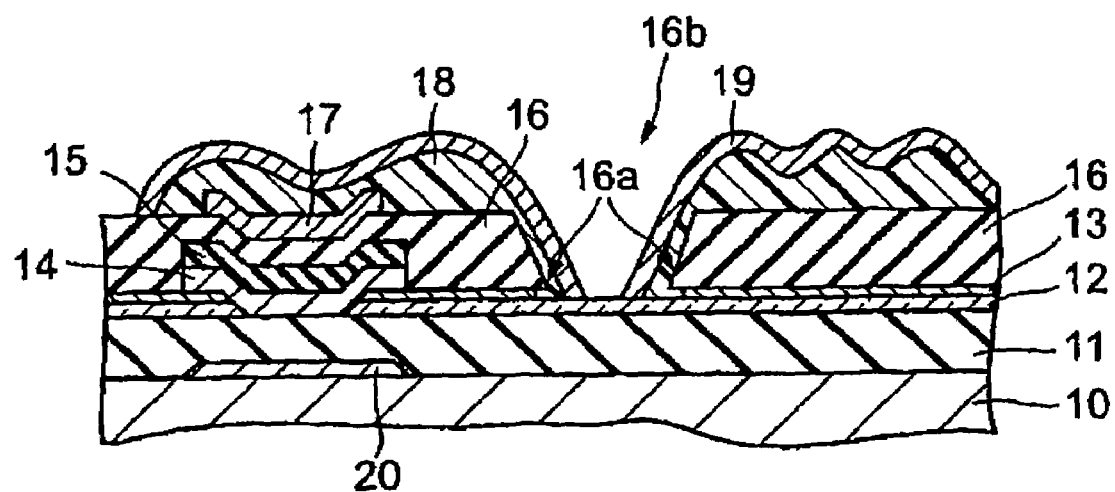
FIG. 1 is a sectional view showing a part of a liquid crystal display device obtained by a method for manufacturing a liquid crystal display device according to the invention.

FIG. 1 is a sectional view showing a part of a liquid crystal display device obtained by a method for manufacturing a liquid crystal display device according to the invention. The case is explained herein that the liquid crystal display device is a transflective type liquid crystal display device. In addition, with respect to portions to explain below, described are regions of a gate electrode, gate insulating film and their vicinities in an active-matrix type liquid crystal display device, and omitted are the other portions not directly pertinent to the present invention. A structure of the other portions is almost the same as a conventional structure.

A light shield film 20 to prevent light from being directly incident on TFT is provided on one main surface of a glass substrate 10 that is an insulating transparent substrate. The light shield film 20 is formed in a region on the glass substrate corresponding to a region including a region (gap) between a source electrode and a drain electrode described later. A silicon oxide film (for example, $SiO_2$) 11 that is an interlayer insulating film is formed on the glass substrate 10 with the light shield film 20 formed thereon. In addition, a quarts substrate or a transparent plastic substrate may be used as a substitute for the glass substrate. The insulating transparent substrate is thus used in the case of the transflective type liquid crystal display device, while a silicon substrate may be used in the case of a reflective type liquid crystal display device. In addition, in the case of the reflective type liquid crystal display device, the light shield film is not necessary.

The source electrode and the drain electrode are formed on the silicon oxide film 11. Each of the source electrode and the drain electrode has a two-layer structure comprised of an ITO film 12 that is a transparent electrode and a metal film 13 formed on the ITO film 12. In addition, the source electrode and the drain electrode are not limited to the two-layer structure, and may be formed from one layer, three layers or more. The gap is formed between the source electrode and the drain electrode, and an a-Si film 14 that is a semiconductor film is formed in the gap and on the source electrode and the drain electrode in the vicinity of the gap.

A silicon nitride film (for example, SiN) 15 that is a gate insulating film is formed on the a-Si film 14. A silicon nitride film 16 that is the gate insulating film is formed on the a-Si film 14, the silicon nitride film 15, the source electrode and the drain electrode. A contact-hole is formed in an opening portion 16b of the silicon nitride film (for example, SiN) 16, and an overhang portion 16a is formed which protrudes to the contact-hole side. In addition, the case is explained herein that the gate insulating film has the two-layer structure comprised of silicon nitride films 15 and 16; the gate insulating film may have a single-layer structure. The gate electrode 17 is formed in the region including the gap of the silicon nitride film 16. An organic material film 18 for IDR is formed on the reflective region (region where the reflective electrode is provided) with such a structure. The overhang portion 16a is embedded in the organic material film 18 because the material constituting the organic material film 18 comes around the portion 16a in forming the organic material film 18. Projections and depression are formed on the surface of the organic material film 18 to provide the reflective electrode with the light diffusing capability. A reflective electrode 19 is formed on the organic material film 18. In addition, used as materials of the gate electrode 17 and reflective electrode 19 are generally used materials.

In thus configured liquid crystal display device, the organic material film 18 constituting the IDR structure is not exposed to plasma in forming the contact-hole, and thereby, is capable of maintaining desired shapes of the projections and depressions. Thus, the liquid crystal display device is capable of adequately exhibiting optical effects using IDR.

Figure 2:
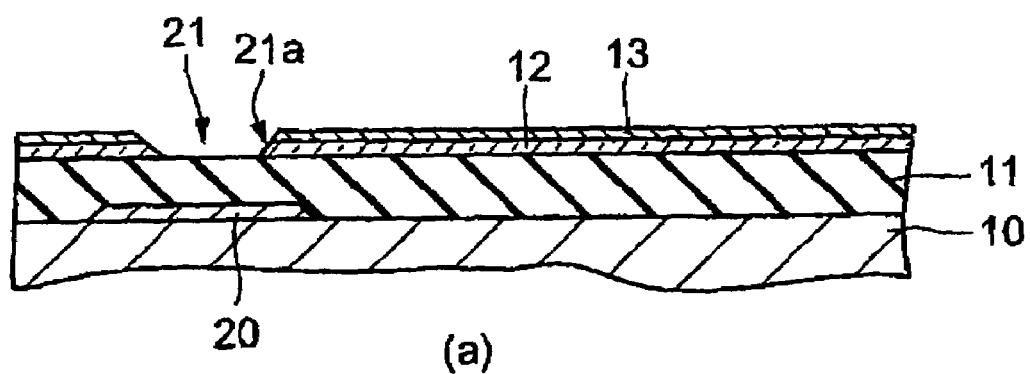
FIGS. 2a and 2b are sectional views showing a method for manufacturing a liquid crystal display device according to the invention.
Figure 2:
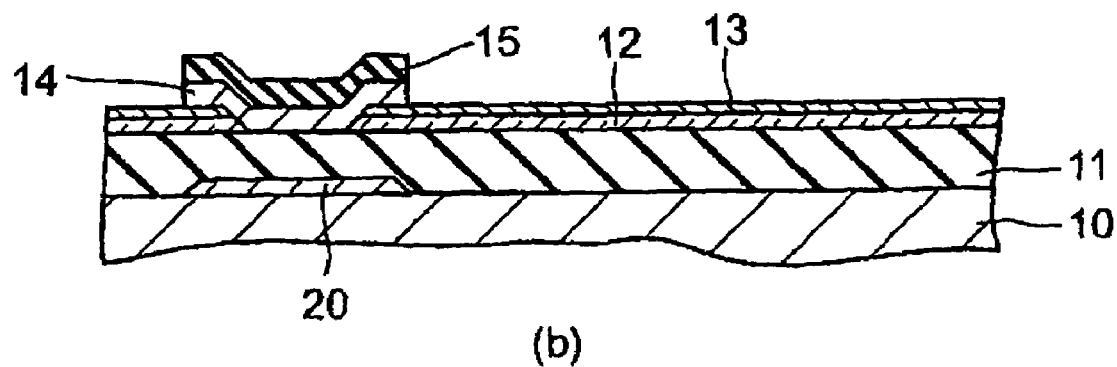
Figure 3:
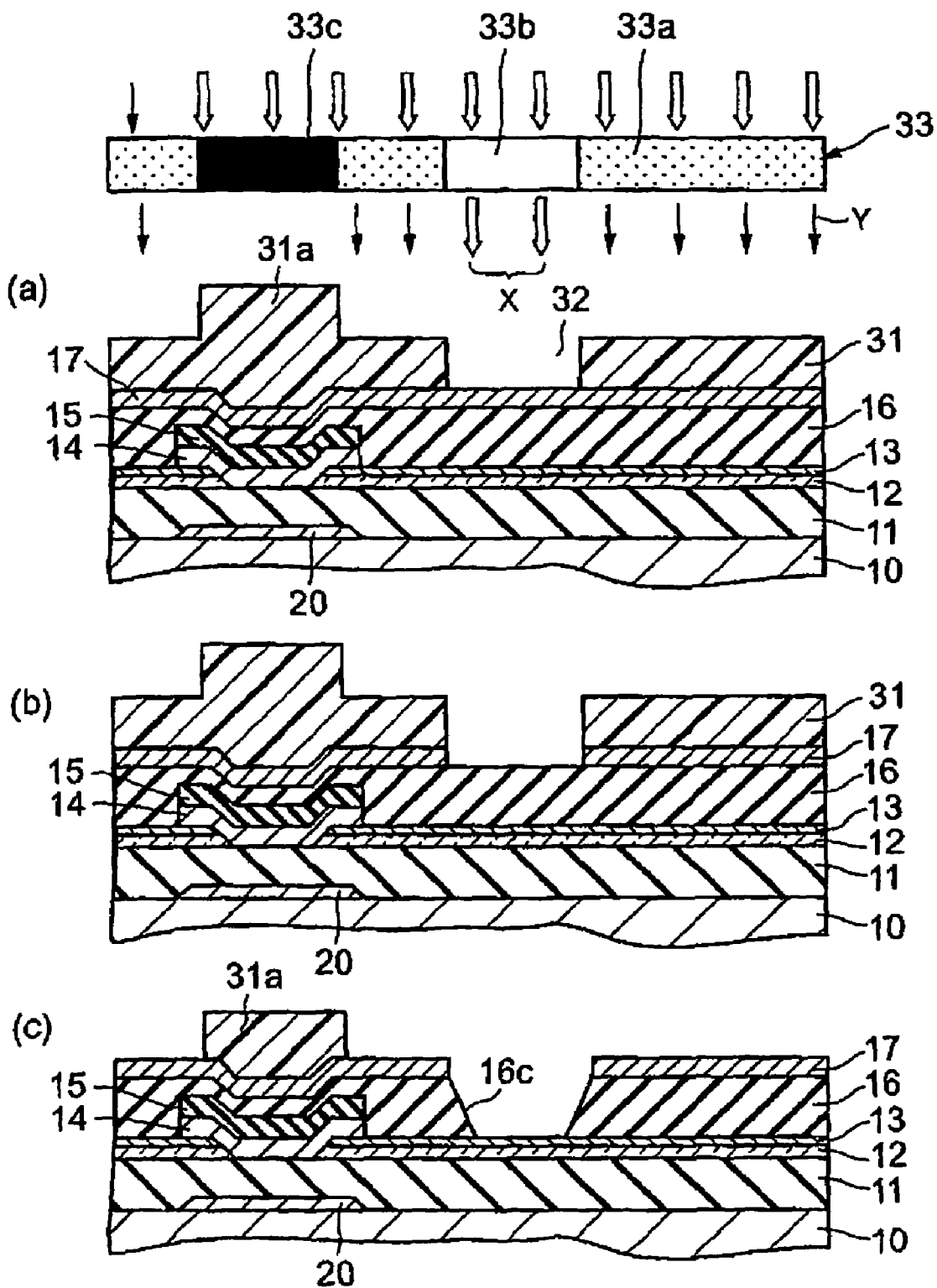
FIGS. 3a to 3c are sectional views showing a method for manufacturing a liquid crystal display device according to the invention.
Figure 4:
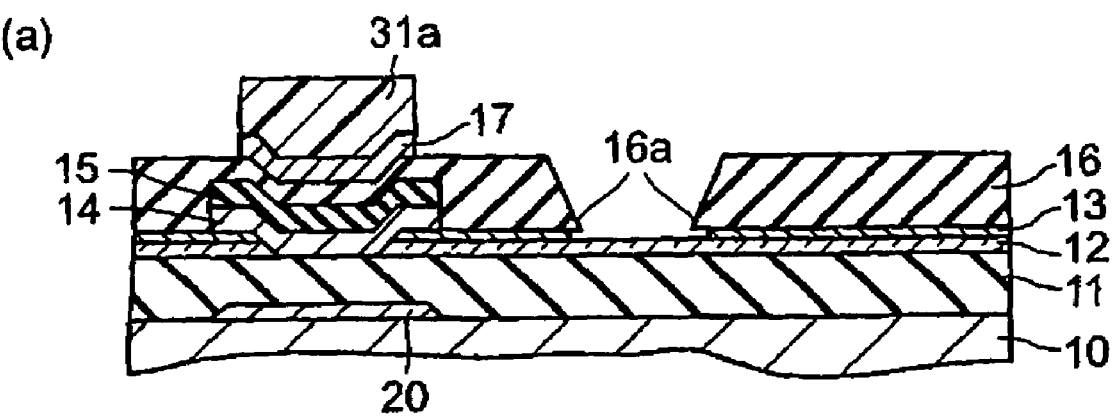
FIGS. 4a to 4c are sectional views showing a method for manufacturing a liquid crystal display device according to the invention.
Figure 4:
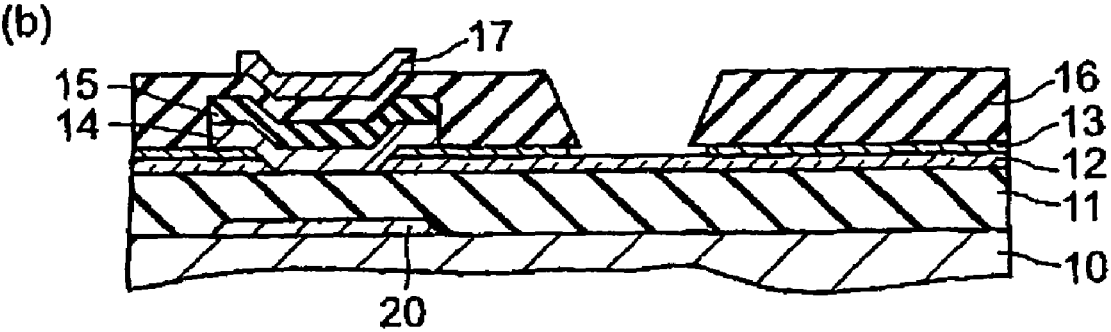
Figure 4:
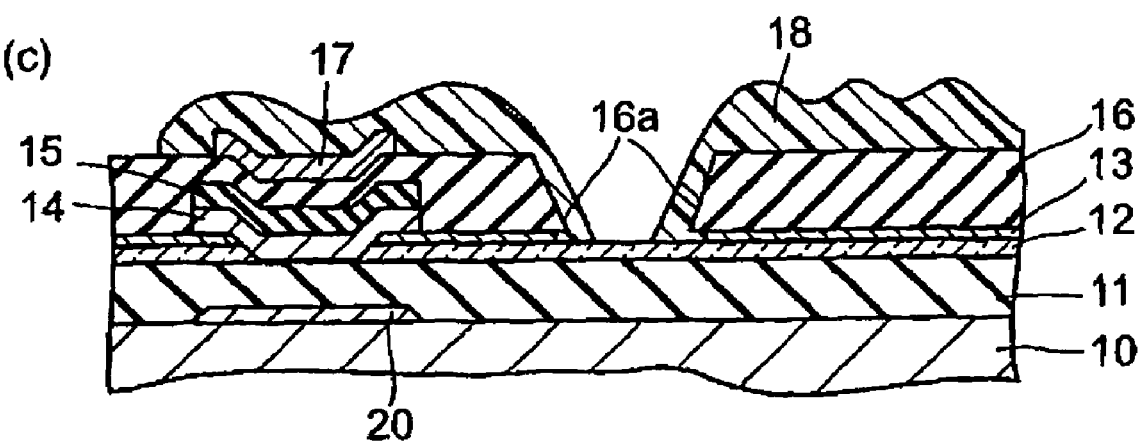

A method for manufacturing the liquid crystal display device according to this Embodiment will be described below with reference to FIGS. 2 to 4. FIGS. 2 to 4 are sectional views showing the method for manufacturing a liquid crystal display device according to the invention.

First, as shown in FIG. 1(a), for example, the chrome film is deposited on the glass substrate 10, and the light shield film 20 is formed by leaving the chrome film in a portion (region including the gap between the source electrode and the drain electrode) corresponding to a wiring region by the photolithography process and the etching process. Next, the silicon oxide film 11 that is the interlayer insulating film is formed on the glass substrate 10 and the light shield film 20.

Then, as shown in FIG. 2(a), the ITO film 12 and the metal film 13 are successively formed on the silicon oxide film 11, and an opening portion (gap) 21 is formed in the gate region by the photolithography process and the etching process. In order to improve coverage of a film to be formed thereon, the opening portion 21 is provided with taper portions 21a such that the width decreases toward the silicon oxide film 11 side. In addition, in a structure of this portion, it is indispensable that an edge portion of the metal film 13 exists on an inner side than an edge portion of the ITO film 12, and it is preferable to provide the taper. In such a structure, P atoms are absorbed on the surface of the ITO film 12 by irradiating the structure with plasma of $PH_3$ before forming the a-Si film As a result, ohmic characteristics are obtained between the a-Si and ITO.

Subsequently, as shown in FIG. 2(b), the a-Si film 14 and the silicon nitride film 15 are successively formed on the metal film 13 with the opening portion 21, and are left in the gate region (the gap and the source and drain electrodes in the vicinity of the gap) by the photolithography process and the etching process.

Next, the silicon nitride film 16 that is the gate insulating film is formed on the entire surface of the substrate. Further, as shown in FIG. 3(a), a metal film 17 for the gate electrode is formed on the film 16. Furthermore, a photo-resist film 31 that is an organic material film is formed on the film 17. The photo-resist film 31 undergoes patterning using a halftone mask 33.

The halftone mask 33 has a half-transparent portion 33a that passes part of light, a transparent portion 33b that passes the entire light and a light shield portion 33c that does not pass the light. The transparent portion 33b of the halftone mask 33 is provided corresponding to a region where a contact-hole is formed in the gate insulating film. The shield portion 33c is provided corresponding to the region including the gap 21. The half-transparent potion 33a constitutes the other portion of the halftone mask 33.

When a photo resist is exposed to light using the halftone mask 33, the entire exposure light (arrows S in the figure) is passed through the transparent portion 33b, and part of the exposure light (arrows Y in the figure) is passed through the half-transparent portion 33a. Meanwhile, the exposure light is not passed through the shield portion 33c. Therefore, the photo resist in the portion corresponding to the shield portion 33c constitutes a thick portion 31a. Furthermore, the photo resist in the portion corresponding to the half-transparent portion 33b is removed and an opening portion 32 is formed. Further, the photo resist in the portion corresponding to the half-transparent portion 33a is partially removed. In this way, a photo-resist film 31 having the thick portion 31a and the opining portion 32 is formed.

Next, as shown in FIG. 3(b), the metal film 17 for the gate electrode is etched using the photo-resist film 31 as a mask. By this means, the silicon nitride film 16 is exposed corresponding to the opening portion 32. Then, as shown in FIG. 3(c), the exposed silicon nitride film 16 undergoes dry etching using the etched metal film 17 as a mask, and the contact-hole is thus formed. At this point, a taper portion 16c is formed in the contact hole such that the width decreases toward the metal film 13. An example used as plasma is a mixed gas of $SF_6$ and $O_2$. The mixed gas etches organic materials, and therefore decreases the thickness of the photo-resist film 31. Then, in the photo-resist film 31, only the thick portion 31a remains on the region including the gap of the metal film 17 for the gate electrode. When the photo-resist remains on the metal film 17 except the remaining thick portion 31a, it is desirable to remove the residual resist by ashing with $O_2$ plasma.

Then, as shown in FIG. 4(a), the metal film 17 is etched using the thick portion 31a as a mask, and the gate electrode is formed in the region including the gap of the silicon nitride film 16. At the same time, the metal film 13 constituting the source electrode is etched. When the metal film 13 is etched, overhang portions 16a are formed in the silicon nitride film 16 due to over etching. Subsequently, the thick portion 31a of the photo resist is removed as shown in FIG. 4(b).

Next, as shown in FIG. 4(c), the organic material film 18 for IDR is formed in the reflective region (including the gate electrode 17 and the taper portions of the silicon nitride film of the contact-hole) other than the contact-hole forming region, and projections and depressions are formed on the surface of the organic material film 18. At this point, since the material constituting the organic material film 18 comes around the overhang portion 16a of the silicon nitride film 16, the portion 16a is embedded in the organic material film 18. The formation of projections and depressions is performed, for example, by forming the first-layer organic material film, performing exposures on the film while varying the intensity of light with place to leave the organic material film in the form of islands, and forming the second-layer organic material film on the first-layer organic material film. In addition, the formation of projections and depressions is not limited to the aforementioned method, and may be performed by various methods.

Subsequently, the metal film is deposited on the organic material film 18, and the reflective electrode 19 is formed. In addition, as the material of the organic material film 18, a photo resist may be used. As the material of the reflective electrode 19, aluminum may be used. The structure as shown in FIG. 1 is thus obtained.

In the method of the present invention, a photo-resist film, which has a thick portion in the region including the gap between the source and drain electrodes and further has an opening in the contact-hole forming region, is formed on the metal film for the gate electrode. A contact-hole is formed in the gate insulating film using the photo-resist film as a mask, while the photo-resist film is left in the region including the gap, and the gate electrode is formed on the region including the gap by etching the metal film using the photo-resist film as a mask. It is thereby possible to form the contact-hole before forming the organic material film for IDR. Therefore, the organic material film for IDR is not exposed to plasma used in forming the contact-hole. Accordingly, the obtained liquid crystal display device is able to exhibit desired optical characteristics due to IDR. Further, since an additional photolithography process is not required, processes do not become complicated.

Figure 5:
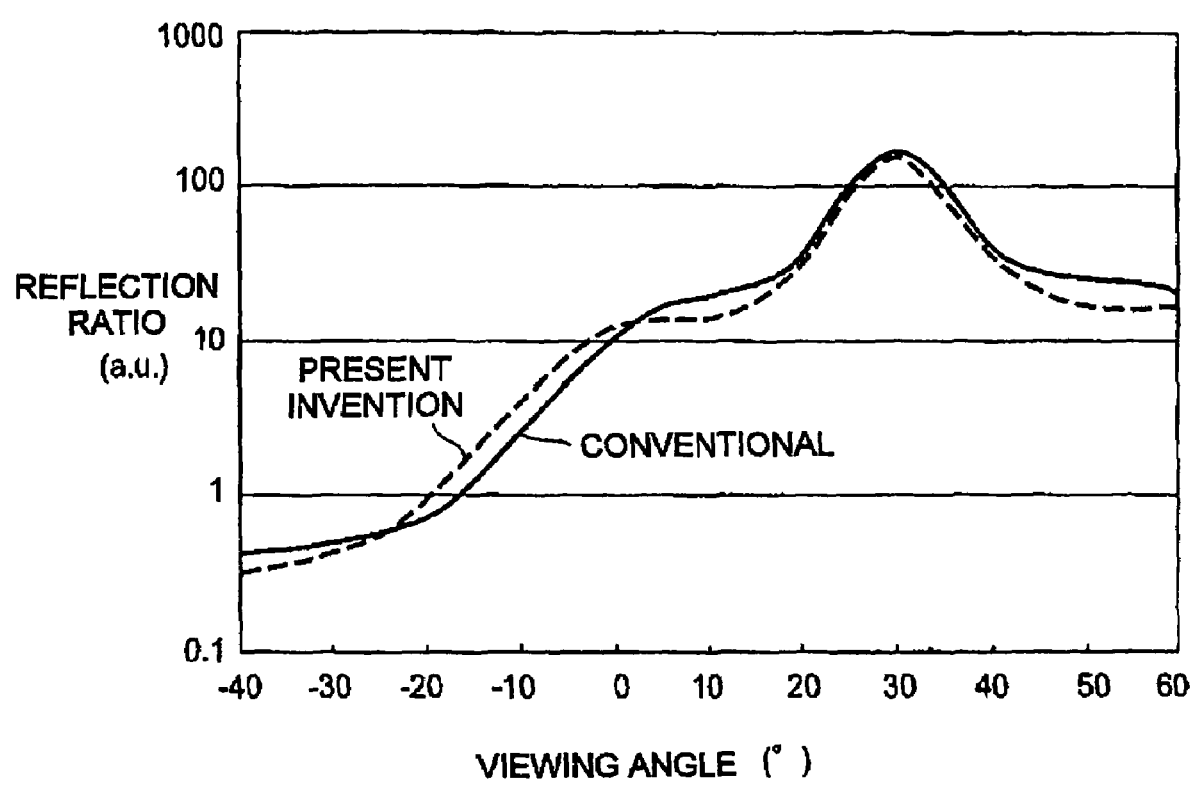
FIG. 5 is a view showing a characteristic of a liquid crystal display device obtained by a method for manufacturing a liquid crystal display device according to the invention.

Next, examples that were executed to clarify the effects of the present invention will be described below. FIG. 5 is a view showing a characteristic of a liquid crystal display device obtained by the method for manufacturing a liquid crystal display device according to the Embodiment of the present invention. FIG. 5 shows the relationship between the reflection ratio and viewing angle, where the dashed line represents the liquid crystal display device obtained by the method of the present invention, while the solid line represents a liquid crystal display device obtained by the conventional method.

Measurements were carried out as follows: Light is applied in the direction shifted 30° from the direction of the normal to the panel surface of the liquid crystal display device, and the light (reflection ratio) reflected by the liquid crystal panel is observed. Then, while varying the position to observe, the reflection ratio is measured at each position. In addition, the case of observing in the direction of the normal to the panel surface is set for the viewing angle of 0°.

As can be seen from FIG. 5, in the liquid crystal display device obtained by the method of the present invention, since the organic material film for IDR was not exposed to plasma, IDR exhibits the desired diffusing capability. In other words, the peak is relatively wide in FIG. 5. Meanwhile, in the liquid crystal display device obtained by the conventional method, since the organic material film for IDR was exposed to plasma, IDR does not exhibit the desired diffusing capability. In other words, the peak is relatively narrow in FIG. 5.

The present invention is not limited to the aforementioned Embodiment, and is capable of being carried into practice with various modifications thereof. For example, materials and structures used in the aforementioned Embodiment are not limited, and it may be possible to use substitutes for the materials and structures capable of exhibiting the functions. In other words, the aforementioned Embodiment describes the case where the silicon oxide film is used as an interlayer insulating film, the silicon nitride film is used as a gate insulating film, and the chrome film is used as the light shield film. However, in the present invention, as long as equivalent functions are exhibited, other materials may be used. Further, a thickness of each film is not limited particularly, as long as the function of each film is exhibited.

Moreover, the above-mentioned Embodiment describes the case of using the halftone mask. In the present invention, it may be possible to use a diffraction mask having a shield portion, transparent portion and half-transparent portion to form the photo-resist film having the thick portion and opening portion. In the case of the diffraction mask, a pattern smaller than the resolution limit of an exposure is formed, and this portion is set as a half-transparent portion. By diffracting the light by the small pattern, weak light passes through the mask.

While the above-mentioned Embodiment describes the case of the transflective type liquid crystal display device, the present invention is similarly applicable to the case of the reflective type liquid crystal display device. The case of the reflective type device is almost the same as the case of the transflective type device except that the light shield film is not necessary, a reflective electrode is formed in the opening portion of the silicon nitride film, etc.

As described above, according to the method for manufacturing a liquid crystal display device of the present invention, a first organic material film, which has a thick portion in the region including the gap between a source and drain electrodes and further has an opening portion in the contact-hole forming region, is formed on the metal film for the gate electrode. A contact-hole is formed in the gate insulating film using the first organic material film as a mask, while the first organic material film is left on the region including the gap, and the gate electrode is formed on the region including the gap by etching the metal film using the first organic material film as a mask. It is thereby possible to form the contact-hole before forming the organic material film for IDR. Therefore, the organic material film for IDR is not exposed to plasma used in forming the contact-hole. Accordingly, the obtained liquid crystal display device is capable of exhibiting desired optical characteristics due to IDR. Further, since an additional photolithography process is not required, processes do not become complicated.

INDUSTRIAL APPLICABILITY

The present invention is applicable to a reflective type liquid crystal display device and a transflective type liquid crystal display device.

SEQUENCE LISTING 10, 100 . . . glass substrate
11, 101 . . . silicon oxide film
12, 102 . . . ITO film
13, 103 . . . metal film
14, 104 . . . a-Si film
15, 16, 105, 106 . . . silicon nitride film
16a . . . overhang portion
16b, 32 . . . opening portion
16c . . . taper portion
17, 107 . . . gate electrode
18, 109 . . . organic material film
19 . . . reflecting electrode
20, 108 . . . light shield film
31 . . . photo-resist film
33 . . . halftone mask
33a . . . half-transparent portion
33b . . . transparent portion
33c . . . light shield portion
110 . . . plasma

The invention claimed is:

1. A method for manufacturing a liquid crystal display device, comprising the steps of:
forming a semiconductor film in a gap between a source electrode and a drain electrode of a thin film transistor in an active-matrix type liquid crystal display device, and forming a first metal film for a gate electrode on the semiconductor film via a gate insulating film;
forming a first organic material film on the first metal film, the first organic material film having a thick portion in a region including the gap and an opening portion in a contact-hole forming region;
forming a contact-hole in the gate insulating film by using the first organic material film as a mask, while leaving the first organic material film in the region including the gap;
forming the gate electrode on the region including the gap by etching the first metal film by using the first organic material film left as a mask; and
forming a second organic material film having projections and depressions in a reflective region except the contact-hole forming region, and forming a reflective electrode on the second organic material film having the projections and depressions.

2. The method as claimed in 1, wherein the source electrode is comprised of a transparent electrode and a second metal film formed on the transparent electrode, and the first metal film and the second metal film are both etched when the first metal film is left on the region including the gap.

3. The method as claimed in claim 1, wherein the first organic material film is formed by using a mask having a shield portion, a half-transparent portion and a transparent portion such that the shield portion is arranged in the region including the gap and the transparent portion is arranged in the contact-hole forming region, performing exposures on an organic material film, and developing the organic material film exposed.

4. The method as claimed in claim 3, wherein the mask is a halftone mask or a diffraction mask.

5. The method as claimed in claim 1, wherein the first metal film in the contact-hole forming region is etched by using the first organic material film as a mask, and then the contact-hole is formed in the gate insulating film by using the first metal film as a mask.

* * * * *